US009940820B2

(12) United States Patent
Watkins et al.

(10) Patent No.: US 9,940,820 B2
(45) Date of Patent: Apr. 10, 2018

(54) SYSTEMS AND METHODS FOR VERIFIED THREAT DETECTION

(71) Applicant: Honeywell International Inc., Morristown, NJ (US)

(72) Inventors: Michael Watkins, Prairie Village, KS (US); James Gerard McAward, Blue Point, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 14/926,835

(22) Filed: Oct. 29, 2015

(65) Prior Publication Data
US 2017/0124851 A1    May 4, 2017

(51) Int. Cl.
| G08B 23/00 | (2006.01) |
| G08B 25/00 | (2006.01) |
| G08B 21/02 | (2006.01) |
| G08B 17/12 | (2006.01) |
| G08B 21/14 | (2006.01) |

(52) U.S. Cl.
CPC ........... *G08B 25/006* (2013.01); *G08B 17/12* (2013.01); *G08B 21/02* (2013.01); *G08B 21/14* (2013.01)

(58) Field of Classification Search
CPC .............. G08B 13/19641; G08B 17/10; G08B 13/19695; H04N 7/12
USPC .............................. 340/573.1, 506, 540, 541
See application file for complete search history.

(56) References Cited

U.S. PATENT DOCUMENTS

| 6,975,220 B1* | 12/2005 | Foodman ............ G06F 17/3089 340/506 |
| 9,449,482 B2* | 9/2016 | Piel .................. G08B 13/19676 |
| 2005/0253706 A1* | 11/2005 | Spoltore .............. G08B 25/008 340/539.14 |
| 2009/0167862 A1* | 7/2009 | Jentoft ............. G08B 13/19641 348/143 |
| 2010/0148672 A1 | 6/2010 | Hopper |
| 2011/0317007 A1* | 12/2011 | Kim ....................... G08B 17/10 348/143 |
| 2012/0082839 A1 | 4/2012 | Ha et al. |
| 2013/0147627 A1 | 6/2013 | Svenning |
| 2014/0240493 A1 | 8/2014 | Bang et al. |
| 2015/0249777 A1 | 9/2015 | Chen |

FOREIGN PATENT DOCUMENTS

| EP | 2 570 723 A1 | 3/2013 |
| GB | 2471784 A | 12/2011 |
| GB | 2523283 A | 8/2015 |
| WO | 2006007859 A2 | 1/2006 |

OTHER PUBLICATIONS

Extended European search report from corresponding EP patent application 16194698.3, dated Aug. 31, 2017.
Partial European search report for corresponding EP patent application 16194698.3, dated Mar. 30, 2017.

* cited by examiner

Primary Examiner — Tai T Nguyen
(74) Attorney, Agent, or Firm — Husch Blackwell LLP

(57) ABSTRACT

Systems and methods for verified threat detection are provided. Some systems can include a sensor monitoring an ambient region and an image capturing device, wherein, upon the sensor detecting an alarm condition in the ambient region, the image capturing device is activated for capturing an image of the ambient region to determine whether the image is consistent with the alarm condition.

6 Claims, 1 Drawing Sheet

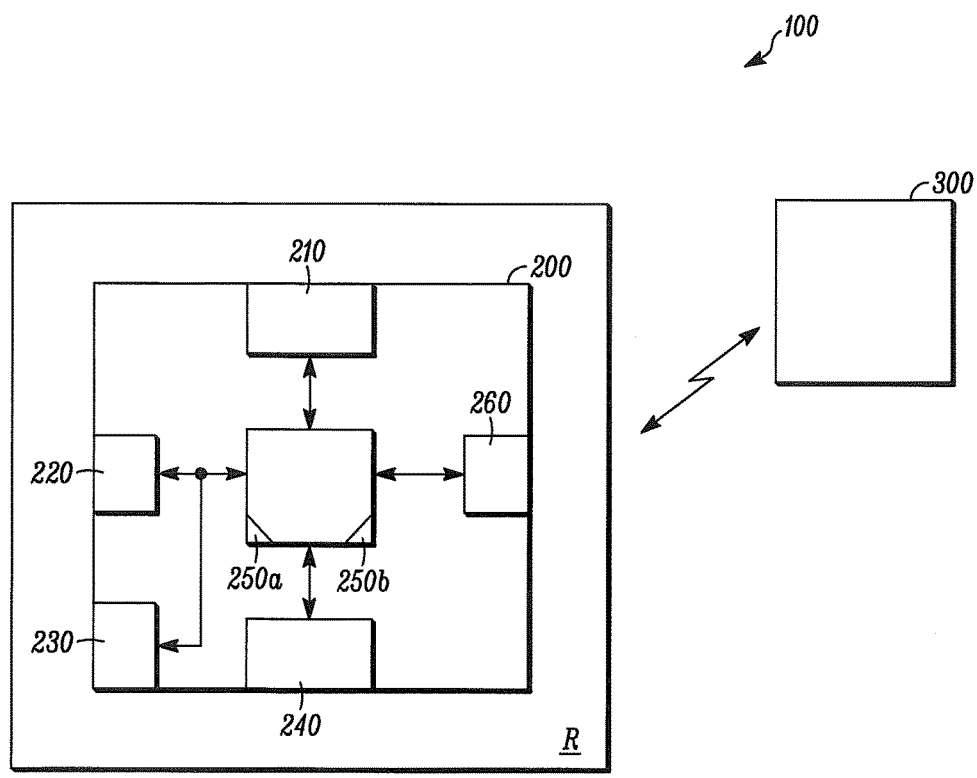

SYSTEMS AND METHODS FOR VERIFIED THREAT DETECTION

FIELD

The present invention relates generally to security systems and methods. More particularly, the present invention relates to systems and methods for verified threat detection.

BACKGROUND

Smoke and fire detectors are known in the art. However, known smoke and fire detectors can produce false alarms, and there are no known systems to easily and accurately verify alarms produced by these detectors. Furthermore, when a smoke, fire, or other life safety alarm occurs, there are no known systems to easily and accurately locate potential victims within a monitored region.

In view of the above, there is a continuing, ongoing need for improved systems and methods.

BRIEF DESCRIPTION OF THE DRAWINGS

FIG. 1 is a block diagram of a system in accordance with disclosed embodiments.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include systems and methods for verified threat detection. For example, in some embodiments, when an automatic smoke or fire detector produces an alarm, systems and methods disclosed herein can verify the alarm to be a verified threat. Furthermore, in some embodiments, when a smoke, fire, or life safety alarm occurs, systems and methods disclosed herein can assist first responders and the like in locating potential victims in a region monitored by the detector producing the alarm.

In accordance with disclosed embodiments, a smoke, fire, heat, toxic gas, or other life safety detector can include a video camera or other image or motion capturing device. The camera can remain off under normal conditions. However, when the detector detects an alarm condition, the camera can turn on and capture one or more images for determining whether any smoke, fire, or the like is within its field of view. For example, in some embodiments, the camera can transmit the captured images to a remote central monitoring station for review by an operator. Additionally or alternatively, in some embodiments, the camera can compare the image captured after the detector detected the alarm condition with the image captured before the detector detected the alarm condition.

In some embodiments, the camera can be part of a first response system for transmitting the captured images to first responders and the like to guide those responders to the potential victims in the region monitored by the detector.

In accordance with disclosed embodiments, the detector can additionally or alternatively include an illumination system, for example, one or more white or IR LED devices. The illumination system can remain off under normal conditions. However, when the detector detects the alarm condition, the illumination system can turn on to illuminate a monitored region, for example, a dark or smoke-occluded monitored region, to facilitate capturing the images of the monitored region or identifying the potential victims in the monitored region. In some embodiments, the illumination system can automatically turn on when the detector detects the alarm condition. In some embodiments, the illumination system can turn on when the detector or camera detects that the monitored region is dark or smoke-occluded.

Many consumers, particularly residential consumers, have privacy concerns when the images or video of the monitored region are captured. However, privacy concerns can be abated by systems and methods disclosed herein because the video system, including the camera, can only be activated when a sensor or the detector detects the alarm condition.

In some embodiments, the detector can be part of a security system or an ambient condition monitoring system, and activation of the camera can be dependent on a state of the security system or the ambient condition monitoring system. For example, when the detector detects the alarm condition, or upon the detector receiving an instruction signal from the monitoring station, the camera can turn on and capture one or more images only when the security system or the ambient condition monitoring system is in an "armed" or otherwise activated state. That is, in some embodiments, when the security system or the ambient condition monitoring system is in a "disarmed" or otherwise deactivated state, the camera can remain off, even when the detector detects the alarm condition.

In accordance with disclosed embodiments, the smoke, fire, heat, toxic gas, or other life safety detector can include a temperature-reading device, such as a thermistor or the like. The temperature-reading device can read a temperature of an ambient region at predetermined intervals for creating a periodic local record of temperature. When the detector detects the alarm condition, previously and currently recorded temperatures can be used to confirm whether the temperature of the ambient region changed in accordance with the detected alarm condition. For example, when the detector detects a fire condition, the temperature of the ambient region should have risen at a predetermined rapid rate. In some embodiments, systems and methods disclosed herein can compare the record of temperature created by the temperature-reading device associated with the detector detecting the alarm condition with the record of temperature created by the temperature-reading device associated with a second detector located at a different location within the monitored region.

FIG. 1 is a block diagram of a system 100 in accordance with disclosed embodiments. As seen in FIG. 1, the system 100 can include a monitoring device 200 in communication with a remote monitoring station 300. For example, in some embodiments, the monitoring device 200 can communicate with the monitoring station 300 via a communication medium that includes one or more of a WiFi, IP, GSM, or LTE based network. In some embodiments, the monitoring device 200 can transmit a signal to the monitoring station 300 regarding a detected alarm condition or a signal that includes captured images, video data, or temperature data.

In accordance with the above, the monitoring device 200 can include a sensor 210 and one or more of an image capturing device 220, an illumination system 230, or a temperature-reading device 240 for monitoring an ambient region R. For example, in some embodiments, the sensor 210 can include a smoke, fire, heat, toxic gas, or other life safety sensor. In some embodiments, the image capturing device 220 can include a video camera. In some embodiments, the illumination system 230 can include one or more white or IR LED devices. In some embodiments, the temperature-reading device 240 can include a thermistor.

The monitoring device 200 can also include control circuitry 250, one or more programmable processors 250a, and executable control software 250b as would be understood by one of ordinary skill in the art. The executable control software 250b can be stored on a transitory or non-transitory computer readable medium, including, but not limited to local computer memory, RAM, optical storage media, magnetic storage media, and the like. In some embodiments, the control circuitry 250, the programmable processor 250a, and the control software 250b can execute and control the methods as described above and herein.

For example, when the sensor 210 detects the alarm condition, the sensor 210 can transmit a corresponding signal to the control circuitry 250 and, responsive thereto, the control circuitry 250 can transmit a signal to one or more of the image capturing device 220, the illumination system 230, or the temperature-reading device 240 for activation thereof. In some embodiments, the control circuitry 250 can transmit the activation signal to the illumination system 230 each time the control circuitry 250 transmits the activation signal to the image capturing device 220. However, in some embodiments, the control circuitry 250 can transmit the activation signal to the illumination system 230 only when the sensor 210, the image capturing device 220, or the control circuitry 250 detects or determines that the ambient region R is dark or smoke-occluded.

When activated, the image capturing device 220 can capture one or more images of the ambient region R and transmit a corresponding signal to the control circuitry 250. Upon receipt of the images from the image capturing device 220, the control circuitry 250, programmable processor 250a, and executable control software 250b can process the images for determining whether the images captured within a field of view of the image capturing device 220 are consistent with the alarm condition detected by the sensor 210 and, therefore, that the alarm condition is a verified threat. Additionally or alternatively, the control circuitry 250 can transmit the images, via a transceiver 260, to the remote monitoring station 300 for further processing thereof and for determining whether the alarm condition detected by the sensor 210 is the verified threat. Additionally or alternatively, the control circuitry 250 can transmit the images, via the transceiver 260, to the remote monitoring station 300 or first responders for locating potential victims in the ambient region R.

Upon receipt of the signal from the sensor 210 indicating detection of the alarm condition, the control circuitry 250 can transmit a signal to the temperature-reading device 240 requesting previously and currently recorded temperatures. Then, the control circuitry 250, programmable processor 250a, and executable control software 250b can process the recorded temperatures for determining whether a temperature of the ambient region R changed in accordance with the detected alarm condition. Additionally or alternatively, the control circuitry 250 can transmit the recorded temperatures, via the transceiver 260, to the remote monitoring station 300 for further processing thereof and for determining whether the temperature of the ambient region R changed in accordance with the detected alarm condition.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
a monitoring device including a sensor monitoring an ambient region, an illumination system, and an image capturing device,
wherein, responsive to the sensor detecting an alarm condition in the ambient region, the image capturing device is activated for capturing an image of the ambient region to determine whether the image is consistent with the alarm condition,
and
wherein, after activation of the image capturing device, the illumination system is automatically activated to illuminate the ambient region when the image capturing device detects that the ambient region is smoke-occluded.

2. The system of claim 1 wherein the sensor includes at least one of a smoke, fire, heat, or toxic gas sensor.

3. The system of claim 1 wherein the image capturing device includes a camera.

4. The system of claim 1 further comprising:
a programmable processor; and
executable control software stored on a non-transitory computer readable medium,
wherein the programmable processor and the executable control software process the image for determining whether the image is consistent with the alarm condition.

5. The system of claim 1 further comprising:
a programmable processor;
executable control software stored on a non-transitory computer readable medium; and
a transceiver,
wherein the programmable processor and the executable control software transmit the image, via the transceiver, to a remote monitoring station for determining whether the image is consistent with the alarm condition.

6. The system of claim 1 wherein the illumination system includes one or more white LED devices or IR LED devices.

* * * * *